United States Patent
Vian et al.

(10) Patent No.: US 9,117,185 B2
(45) Date of Patent: Aug. 25, 2015

(54) FORESTRY MANAGEMENT SYSTEM

(71) Applicants: John Lyle Vian, Renton, WA (US);
George Michael Roe, Seattle, WA (US);
Josha Przbylko, Boston, MA (US)

(72) Inventors: John Lyle Vian, Renton, WA (US);
George Michael Roe, Seattle, WA (US);
Josha Przbylko, Boston, MA (US)

(73) Assignee: THE BOEING COMPANY, Chicago, IL (US)

( * ) Notice: Subject to any disclaimer, the term of this patent is extended or adjusted under 35 U.S.C. 154(b) by 49 days.

(21) Appl. No.: 13/622,739

(22) Filed: Sep. 19, 2012

(65) Prior Publication Data
US 2014/0081479 A1    Mar. 20, 2014

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *G06Q 10/06* | (2012.01) |
| *G06Q 50/02* | (2012.01) |

(52) U.S. Cl.
CPC ............... *G06Q 10/06* (2013.01); *G06Q 50/02* (2013.01)

(58) Field of Classification Search
CPC ......... G06F 17/00; G06F 7/00; G05D 1/0011; G06Q 50/02; G06Q 10/06
USPC .................................................. 701/2, 1, 23
See application file for complete search history.

(56) References Cited

U.S. PATENT DOCUMENTS

| | | |
|---|---|---|
| 4,463,428 A | 7/1984 | Gilliam |
| 4,918,321 A | 4/1990 | Klenk et al. |
| 5,036,935 A | 8/1991 | Kohara |
| 5,220,263 A | 6/1993 | Onishi et al. |
| 5,237,404 A | 8/1993 | Tanaka et al. |
| 5,318,254 A | 6/1994 | Shaw et al. |
| 5,324,948 A | 6/1994 | Dudar et al. |
| 5,334,982 A | 8/1994 | Owen |
| 5,340,056 A | 8/1994 | Guelman et al. |
| 5,351,621 A | 10/1994 | Tanaka et al. |
| 5,487,440 A | 1/1996 | Seemann |
| 5,490,646 A | 2/1996 | Shaw et al. |
| 5,557,260 A | 9/1996 | Legaz |
| 5,633,707 A | 5/1997 | Seemann |
| 5,695,155 A | 12/1997 | Macdonald et al. |
| 5,832,187 A | 11/1998 | Pedersen et al. |
| 5,845,725 A | 12/1998 | Kawada |

(Continued)

FOREIGN PATENT DOCUMENTS

| | | |
|---|---|---|
| CN | 201876969 U | 6/2011 |
| EP | 0512866 | 11/1992 |

(Continued)

OTHER PUBLICATIONS

"In-Sight Line Scan Vision System," Webinar, COGNEX, accessed Feb. 5, 2010 http://www.cognex.com.

(Continued)

*Primary Examiner* — Calvin Cheung
*Assistant Examiner* — Paula L Schneider
(74) *Attorney, Agent, or Firm* — Yee & Associates, P.C.

(57) ABSTRACT

A method and apparatus of managing a forest. A forestry management system comprises a forestry manager. The forestry manager is configured to receive information about a forest from a group of autonomous vehicles, analyze the information to generate a result about a state of the forest from the information, and coordinate operation of the group of autonomous vehicles using the result.

23 Claims, 9 Drawing Sheets

(56) References Cited

U.S. PATENT DOCUMENTS

| | | |
|---|---|---|
| 5,936,245 A | 8/1999 | Goillot |
| 5,963,733 A | 10/1999 | Howard |
| 5,995,884 A | 11/1999 | Allen et al. |
| 6,236,735 B1 | 5/2001 | Bjorner et al. |
| 6,293,141 B1 | 9/2001 | Nance |
| 6,364,026 B1 | 4/2002 | Doshay |
| 6,565,361 B2 | 5/2003 | Jones et al. |
| 6,671,588 B2 | 12/2003 | Otake et al. |
| 6,792,684 B1 * | 9/2004 | Hyyppa .................... 33/1 A |
| 6,819,265 B2 | 11/2004 | Jamieson et al. |
| 6,888,446 B2 | 5/2005 | Nantz et al. |
| 6,904,335 B2 | 6/2005 | Solomon |
| 6,907,799 B2 | 6/2005 | Jacobsen et al. |
| 6,947,797 B2 | 9/2005 | Dean et al. |
| 6,984,952 B2 | 1/2006 | Peless et al. |
| 7,076,335 B2 | 7/2006 | Seemann |
| 7,212,106 B2 | 5/2007 | Katou |
| 7,218,993 B2 | 5/2007 | Yasukawa et al. |
| 7,236,861 B2 | 6/2007 | Paradis et al. |
| 7,250,849 B2 | 7/2007 | Spriggs et al. |
| 7,280,890 B2 | 10/2007 | Seemann |
| 7,327,112 B1 | 2/2008 | Hlynka et al. |
| 7,337,156 B2 | 2/2008 | Wippich |
| 7,414,523 B2 | 8/2008 | Li et al. |
| 7,417,738 B2 | 8/2008 | Taylor et al. |
| 7,499,772 B2 | 3/2009 | Wilcox et al. |
| 7,501,616 B2 | 3/2009 | Wiklof |
| 7,586,422 B2 | 9/2009 | Goodman et al. |
| 7,626,513 B2 | 12/2009 | Goodman et al. |
| 7,627,447 B2 | 12/2009 | Marsh et al. |
| 7,765,038 B2 | 7/2010 | Appleby et al. |
| 7,765,668 B2 | 8/2010 | Townsend et al. |
| 7,797,095 B2 | 9/2010 | Rado |
| 7,813,888 B2 | 10/2010 | Vian et al. |
| 7,817,026 B2 | 10/2010 | Watabe et al. |
| 7,844,364 B2 | 11/2010 | McLurkin et al. |
| 7,860,618 B2 | 12/2010 | Brandstetter et al. |
| 7,894,948 B2 | 2/2011 | Stroud |
| 7,941,261 B2 | 5/2011 | Johnsen |
| 8,051,547 B2 | 11/2011 | Toh et al. |
| 8,060,270 B2 | 11/2011 | Vian et al. |
| 8,078,319 B2 | 12/2011 | Franke et al. |
| 8,140,250 B2 | 3/2012 | Mian et al. |
| 8,150,105 B2 | 4/2012 | Mian et al. |
| 8,255,156 B2 | 8/2012 | Ravenscroft et al. |
| 8,260,485 B1 | 9/2012 | Meuth et al. |
| 8,849,475 B1 * | 9/2014 | Sudolsky et al. .................. 701/3 |
| 2003/0089183 A1 | 5/2003 | Jacobsen et al. |
| 2003/0135327 A1 | 7/2003 | Levine et al. |
| 2004/0030571 A1 | 2/2004 | Solomon |
| 2004/0073411 A1 | 4/2004 | Alston et al. |
| 2004/0158358 A1 | 8/2004 | Anezaki et al. |
| 2005/0113943 A1 | 5/2005 | Nian |
| 2005/0126794 A1 | 6/2005 | Palmer et al. |
| 2005/0217589 A1 | 10/2005 | Daniel et al. |
| 2006/0085106 A1 | 4/2006 | Gaudiano et al. |
| 2006/0176169 A1 | 8/2006 | Doolin et al. |
| 2006/0198952 A1 | 9/2006 | Nagase et al. |
| 2006/0271251 A1 | 11/2006 | Hopkins |
| 2007/0080863 A1 | 4/2007 | Glockler |
| 2007/0129847 A1 | 6/2007 | Ulmer et al. |
| 2007/0146728 A1 | 6/2007 | Pristner |
| 2007/0208442 A1 | 9/2007 | Perrone |
| 2007/0266800 A1 * | 11/2007 | Risk .......................... 73/863.23 |
| 2008/0004749 A1 | 1/2008 | Hostettler |
| 2008/0021604 A1 | 1/2008 | Bouvier et al. |
| 2008/0148876 A1 | 6/2008 | Hock et al. |
| 2008/0252489 A1 | 10/2008 | Naimer et al. |
| 2008/0270866 A1 | 10/2008 | Choi et al. |
| 2009/0024493 A1 * | 1/2009 | Huang et al. .................... 705/28 |
| 2009/0079839 A1 * | 3/2009 | Fischer et al. ............. 348/218.1 |
| 2009/0195396 A1 | 8/2009 | Ballester Merelo et al. |
| 2009/0205845 A1 | 8/2009 | Hoffman |
| 2009/0219393 A1 | 9/2009 | Vian et al. |
| 2009/0243828 A1 | 10/2009 | Hering et al. |
| 2009/0285491 A1 | 11/2009 | Ravenscroft et al. |
| 2010/0023201 A1 | 1/2010 | Kinney et al. |
| 2010/0039294 A1 | 2/2010 | Feyereisen et al. |
| 2010/0063650 A1 | 3/2010 | Vian et al. |
| 2010/0094487 A1 | 4/2010 | Brinkman |
| 2010/0211358 A1 | 8/2010 | Kesler et al. |
| 2010/0235037 A1 | 9/2010 | Vian et al. |
| 2010/0250022 A1 | 9/2010 | Hines et al. |
| 2010/0271191 A1 | 10/2010 | de Graff et al. |
| 2010/0312387 A1 | 12/2010 | Jang et al. |
| 2010/0312388 A1 | 12/2010 | Jang et al. |
| 2012/0038492 A1 | 2/2012 | Maggiore et al. |
| 2012/0041639 A1 | 2/2012 | Followell et al. |
| 2012/0081540 A1 | 4/2012 | Jang |
| 2012/0114185 A1 * | 5/2012 | Ram et al. ...................... 382/110 |
| 2012/0253740 A1 * | 10/2012 | Rojas ........................... 702/156 |
| 2012/0261144 A1 | 10/2012 | Vian et al. |
| 2013/0081245 A1 | 4/2013 | Vavrina et al. |

FOREIGN PATENT DOCUMENTS

| | | |
|---|---|---|
| EP | 1193168 | 4/2002 |
| EP | 1619625 | 1/2006 |
| EP | 1884453 | 2/2008 |
| EP | 2208971 | 7/2010 |
| EP | 2259245 | 12/2010 |
| EP | 2511888 A1 | 10/2012 |
| FR | 2930669 | 10/2009 |
| GB | 2308656 | 7/1997 |
| GB | 2429819 | 3/2007 |
| JP | 2007183172 | 7/2007 |
| WO | 9629597 A1 | 9/1996 |
| WO | WO2004081488 | 9/2004 |
| WO | WO2005113261 | 12/2005 |
| WO | WO2006053433 | 5/2006 |
| WO | WO2007080584 | 7/2007 |
| WO | WO2008127468 | 10/2008 |
| WO | WO2009142933 | 11/2009 |
| WO | WO2010141180 | 12/2010 |
| WO | WO2011119634 | 9/2011 |
| WO | WO2012021177 | 2/2012 |
| WO | WO2012021179 | 2/2012 |
| WO | WO2012047479 | 4/2012 |

OTHER PUBLICATIONS

"Unmanned Aerial Vehicle (UAV) ZALA 421-04M chosen for Aerial Monitoring of Forest Fires," published by news.wood.ru, Feb. 2010, 3 pages.

Non-final office action dated Feb. 24, 2012 regarding U.S. Appl. No. 12/560,569, 27 pages.

USPTO non-final office action dated Jun. 15, 2012 regarding U.S. Appl. No. 13/086,521, 18 pages.

DeVault "Robotic system for underwater inspection of bridge piers," IEEE Instrumentation & Measurement Magazine, vol. 3, Iss. 3, Sep. 2000, pp. 32-37 (abstract).

Frost, "A Practical Guide to Using the In-Sight 5604 Line Scan Vision System—Integration Note", COGNEX, Mar. 23, 2009, 30 pages, accessed Mar. 2009 http://www.cognex.com/support/downloads/File.aspx?d=661.

GB Combined Search and Examination Report dated Jun. 10, 2010 regarding application GB1003830.5, applicant's reference P49034GB/AER, applicant The Boeing Company, 8 pages.

GB Search Report and Examination Report dated Jun. 14, 2011 regarding application GB1100763.0, applicant's reference P51280GB/AER/LJW, applicant The Boeing Company, 7 pages.

Gunatilake et al., "Image Understanding Algorithms for Remote Visual Inspection of Aircraft Surfaces," Proceedings of the SPIE conference on Machine Vision Application in U*ndustrial Inspection V, Copyright 1997, 12 pages.

Ollero, "Multiple Heterogenous Unmanned Aerial Vehicles," Springer Tracts in Advanced Robotics, vol. 37, copyright 2007, 233 pages (abstract).

Final office action dated Jul. 24, 2012 regarding U.S. Appl. No. 12/560,569, 23 pages.

(56) References Cited

OTHER PUBLICATIONS

"Echo Wireless Vibration Monitoring System," PCB Group, Inc., copyright 2014, 2 pages. Accessed Jan. 28, 2014, https://www.imi-sensors.com/Echo_Wireless.aspx?gclid=CLLo3-mvjbwCFaE9QgodYwUAaQ.

"Precision Sensing Components & Systems," SignalQuest Precision Microsensors, copyright 1999-2014, SignalQuest, LLC., 5 pages. Accessed Feb. 5, 2014, http://signalquest.com/products.

"G-Link—LXRS," Lord MicroStrain, copyright 2013, 2 pages. Accessed Jan. 28, 2014, http://www.microstrain.com/wireless/g-link.

Vian, "Vehicle Base Station," U.S. Appl. No. 12/814,322, filed Jun. 11, 2010, 57 pages.

Vian et al., "Aerial Forest Inventory System," U.S. Appl. No. 13/712,165, filed Dec. 12, 2012, 66 pages.

Vian et al., "Tree Metrology System," U.S. Appl. No. 13/712,237, filed Dec. 12, 2012, 68 pages.

Vian et al., "Forest Sensor Deployment and Monitoring System," U.S. Appl. No. 13/708,543, filed Dec. 7, 2012, 120 pages.

Extended European Search Report, dated May 9, 2014, regarding Application No. EP13196125.2, 5 pages.

Merino et al., "An Unmanned Aircraft System for Automatic Forest Fire Monitoring and Measurement," Journal of Intelligent & Robotic Systems, vol. 65, No. 1-4, Jan. 2012, pp. 533-548.

Ollero et al., "Unmanned Aerial Vehicles as tools for forest-fire fighting," V International Conference on Forest Fire Research, D.X. Viegas (Ed.), 2006, 11 pages.

Office Action, dated Dec. 16, 2014, regarding U.S. Appl. No. 13/708,543, 24 pages.

\* cited by examiner

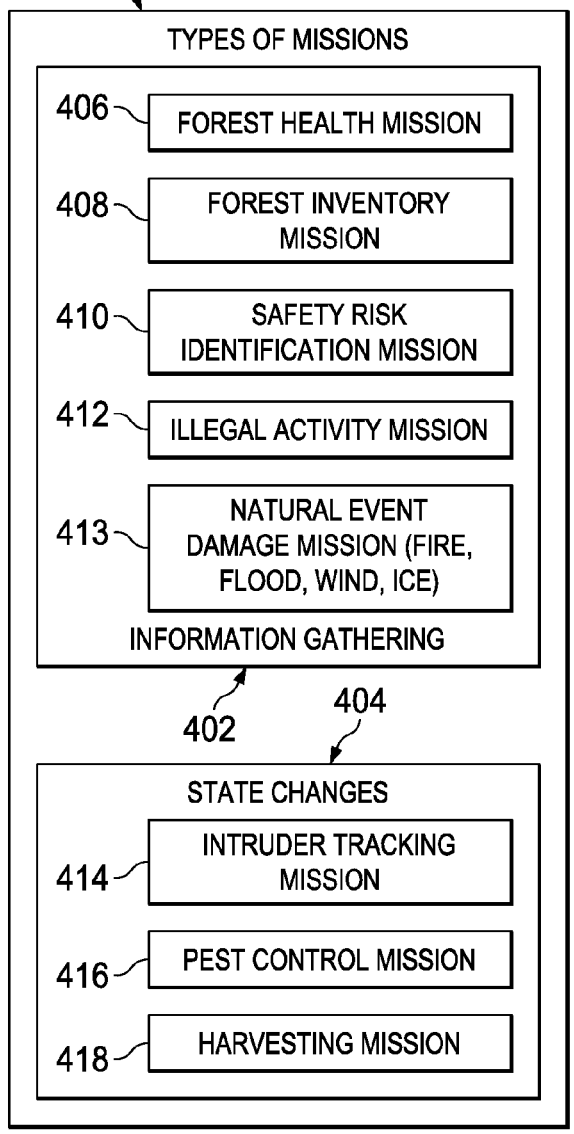
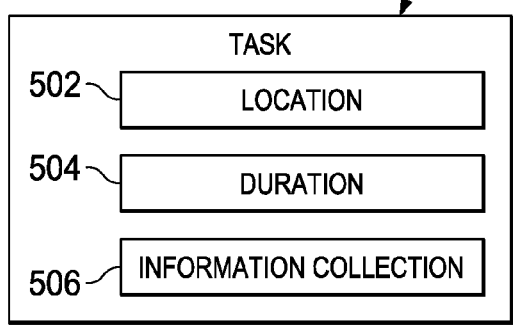

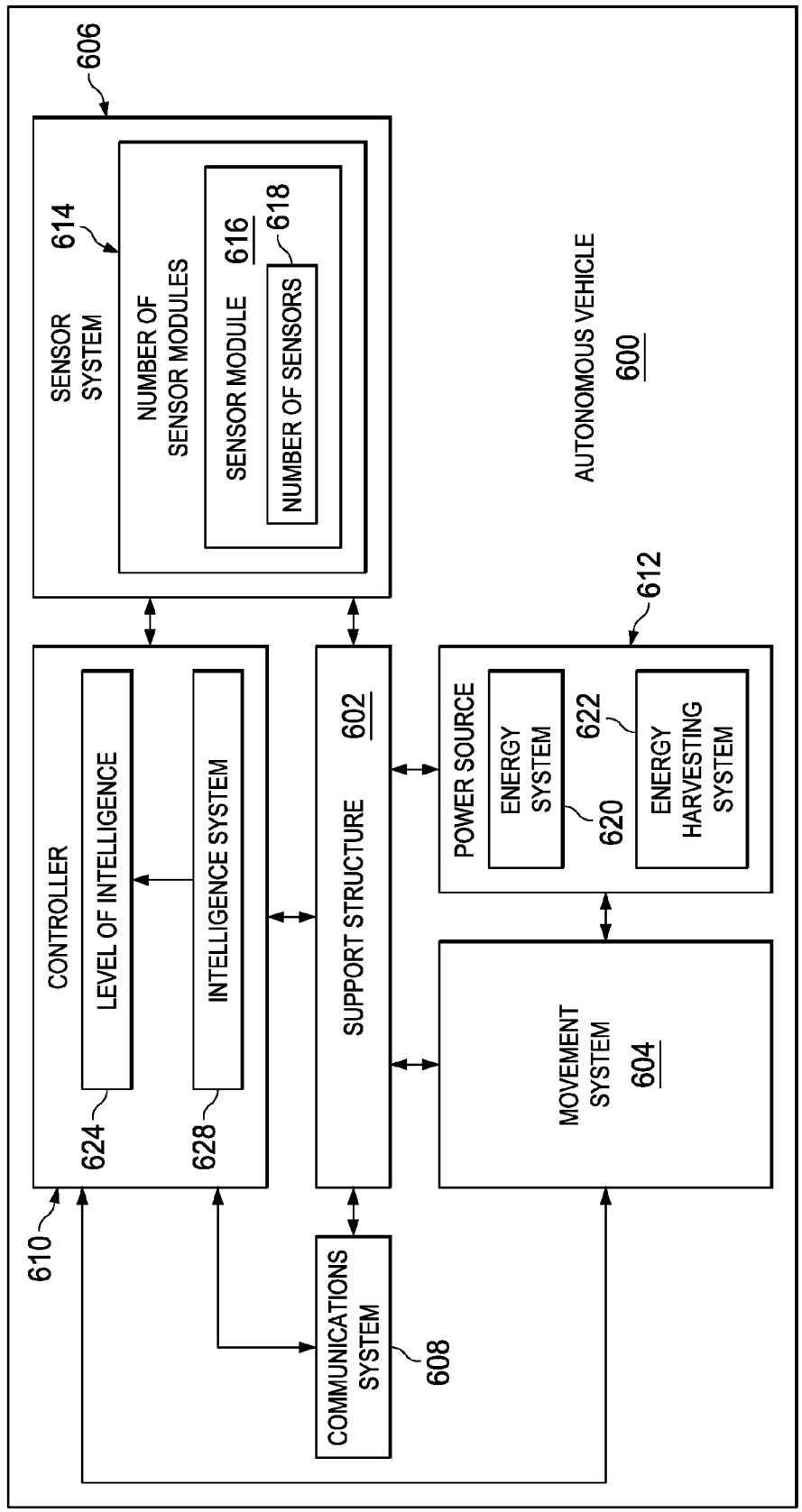

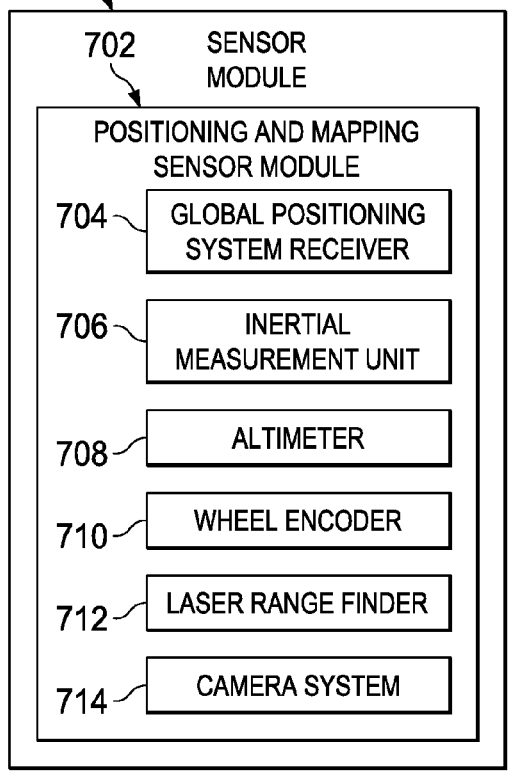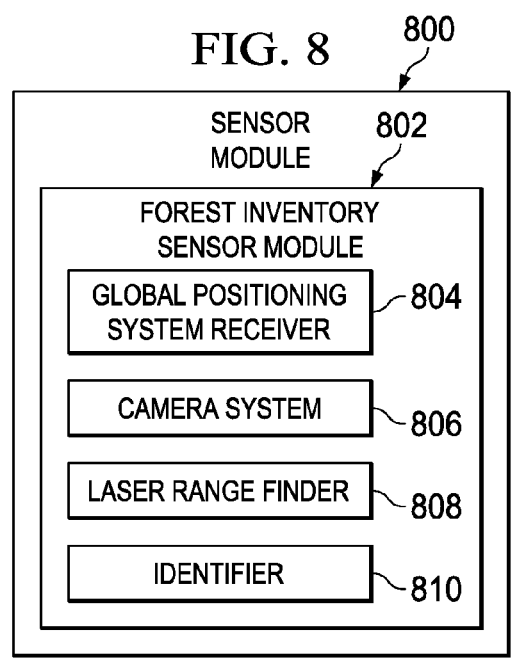

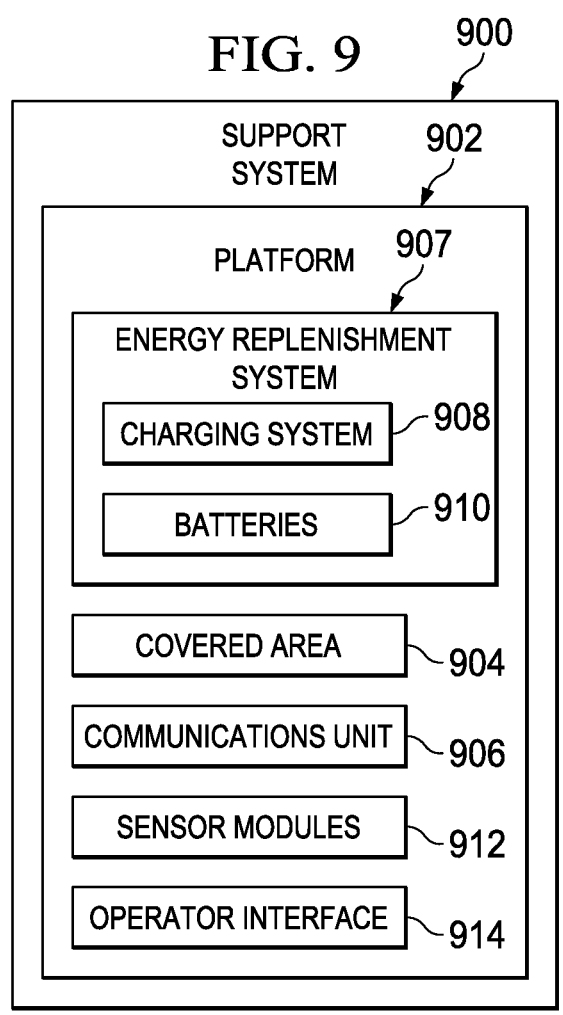

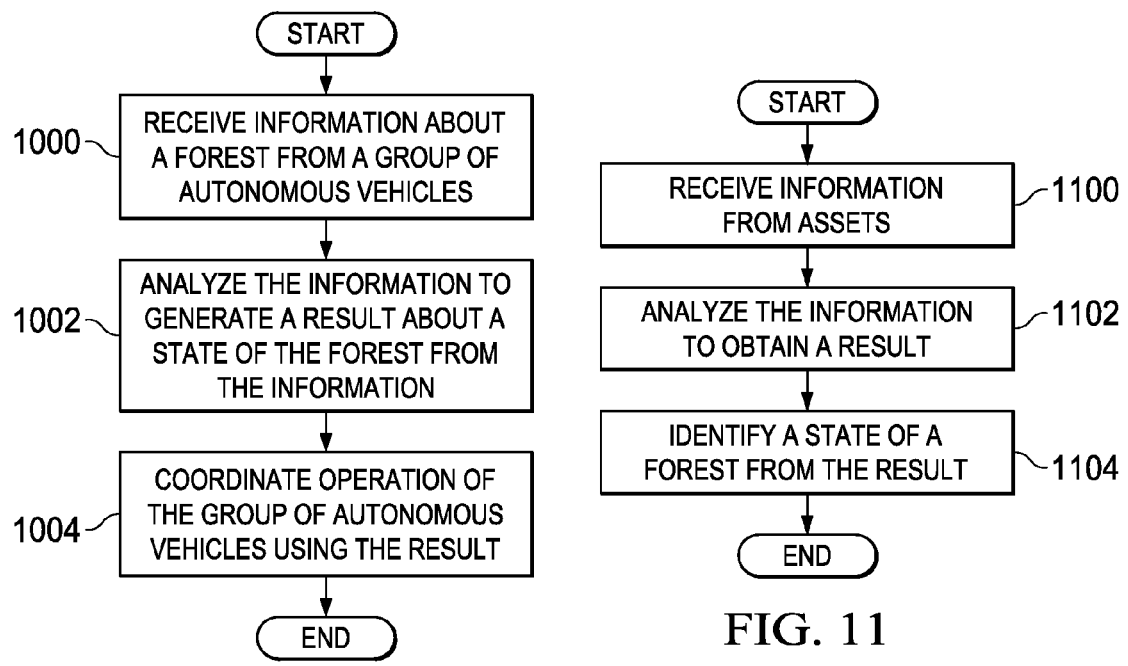
FIG. 10
FIG. 11
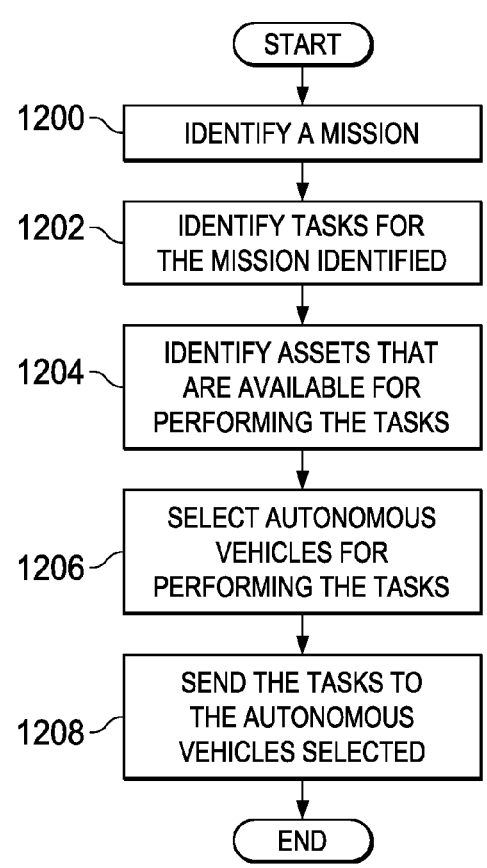
FIG. 12

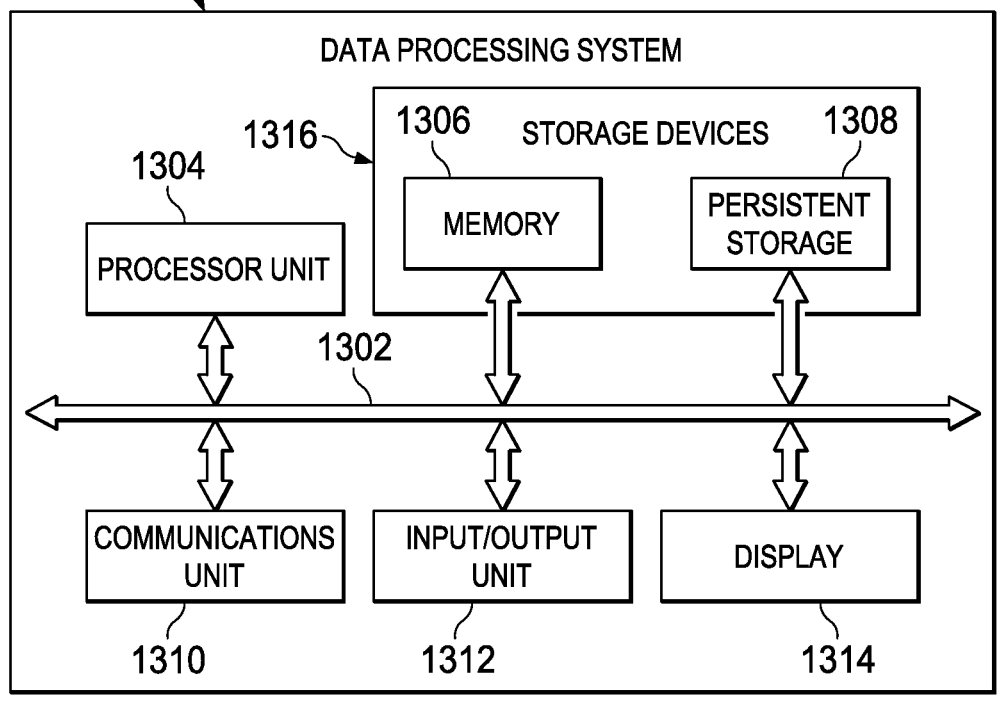
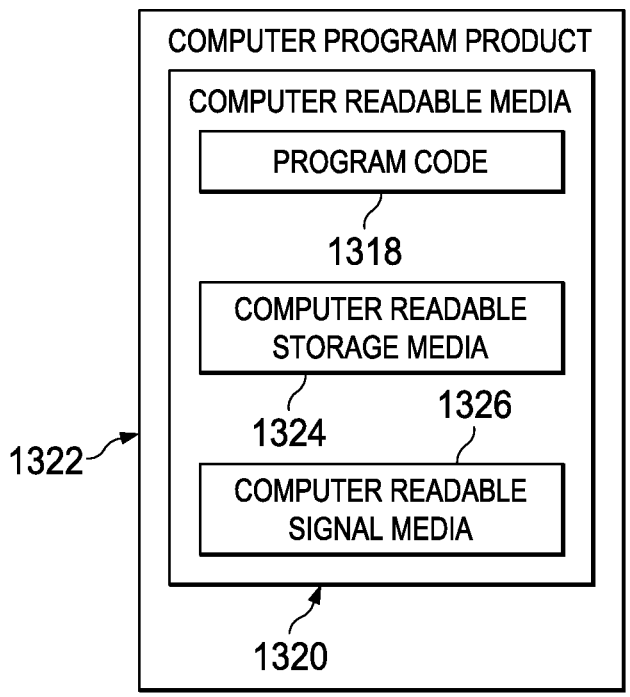
FIG. 13

FORESTRY MANAGEMENT SYSTEM

BACKGROUND INFORMATION

1. Field

The present disclosure relates generally to forest management and, in particular, to forest management operations. Still more particularly, the present disclosure relates to a method and apparatus for performing forest management operations.

2. Background

Forestry management is a branch of forestry that includes many different aspects. These aspects may include environmental, economic, administrative, legal, and social aspects of managing a forest. Forestry management may consist of various techniques such as timber extraction, planting trees, replanting trees, cutting roads and pathways through forests, preventing fires in a forest, maintaining the health of the forest, and other suitable activities.

When performing these and other operations with respect to forest management, collecting information about the forest may be desired. For example, collecting information about the forest provides an ability to analyze the state of the forest as well as identify operations that may be performed.

The tools used to generate information for assessing the state of a forest may include, for example, without limitation, a clinometer, a data recorder, an increment borer, a wedge prism, a diameter tape, a global positioning system device, a tally meter, a laptop computer, and other suitable tools. These tools are used by forestry management personnel to perform various operations such as estimating numbers of trees present in an area, identifying the health of trees, identifying the age of trees, identifying tree spacing, identifying composition of soil samples, and other suitable operations.

With this information, an analysis of the information may be made to identify a state of the forest. This state of the forest may be a forest inventory. This forest inventory may provide results such as the value of the timber, expected cash flows from the timber, the amount of timber land existing, impacts of recreational use, risks of fire, improvements to increase the growth and value of the forest, the time period in which timber should be harvested, and other suitable results.

Currently, the process for collecting information for assessing the state of a forest is very time-consuming and complex. For example, collecting information may require tens of thousands or hundreds of thousands of sensor readings or observations made by forest management personnel for a particular location in the forest. With additional locations, even more information is collected. Moreover, collecting this information within desired time periods and as frequently as desired increases the time and effort needed.

Further, current processes also often rely on sampling when collecting information. Sampling may be performed in selected locations instead of from the entire forest. This type of information collection may be used when obtaining information over the whole forest and is more time-consuming than desired. Further, when sampling, errors may occur due to a lack of adequate information collection and analysis.

The collection of information is performed by forest management personnel using tools that often may require interpretation by the forest management personnel. As a result, different human operators may make different interpretations while making measurements. The lack of consistency of interpretations may lead to undesired results.

For example, two different people may decide that different types of samplings should be used based on two different measurements of tree spacing. As another example, when using a clinometer, measurement of the height of a tree using two different clinometers may produce different results. These differences may provide results that may not be as accurate as desired.

Further, the information may be inconsistent depending on the ability of forest management personnel to reach different portions of the forest. For example, access to certain locations within the forest may be infeasible for forestry management personnel. In these inaccessible regions, the information may be unavailable and as a result the state of the forest may not be identified as accurately as desired.

Additionally, the availability of forest management personnel to collect information may not be as great as desired in order to obtain a desired amount of information for performing an analysis. Additionally, this analysis may not be performed with a desired level of accuracy or with the use of as up-to-date information as desired.

As a result, collecting information needed to analyze the state of the forest is often much more complex and difficult than desired. With the number of pieces of information needed and the frequency at which the information is needed, the amount of forest management personnel needed to obtain this information may be infeasible due to the amount of personnel available or the costs associated with use of these personnel. Further, with the use of human operators to make measurements and observations, the information collected may not be as uniform or as accurate as desired.

Therefore, it would be desirable to have a method and apparatus that takes into account at least some of tissue issues discussed above, as well as other possible issues.

SUMMARY

In one illustrative embodiment, a forestry management system comprises a forestry manager. The forestry manager is configured to receive information about a forest from a group of autonomous vehicles, analyze the information to generate a result about a state of the forest from the information, and coordinate operation of the group of autonomous vehicles using the result.

In another illustrative embodiment, a method for managing a forest is provided. Information about the forest is received from a group of autonomous vehicles. The information is analyzed to generate a result about a state of the forest from the information. Operation of the group of autonomous vehicles is coordinated using the result.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of a block diagram of types of missions in accordance with an illustrative embodiment;

FIG. 5 is an illustration of a block diagram of a task in accordance with an illustrative embodiment;

FIG. 6 is an illustration of a block diagram of an autonomous vehicle in accordance with an illustrative embodiment;

FIG. 7 is an illustration of a block diagram of a positioning and map building sensor module in accordance with an illustrative embodiment;

FIG. 8 is an illustration of a block diagram of a sensor module in accordance with an illustrative embodiment;

FIG. 9 is an illustration of a block diagram of a support system in accordance with an illustrative embodiment;

FIG. 10 is an illustration of a flowchart of a process for managing a forest in accordance with an illustrative embodiment;

FIG. 11 is an illustration of a flowchart of a process for processing information received from assets in accordance with an illustrative embodiment;

FIG. 12 is an illustration of a flowchart of a process for coordinating the operation of assets in accordance with an illustrative embodiment; and FIG. 13 is an illustration of a block diagram of a data processing system in accordance with an illustrative embodiment.

DETAILED DESCRIPTION

The illustrative embodiments recognize and take into account one or more different considerations. For example, the illustrative embodiments recognize and take into account that the currently used systems for collecting information about a forest may not provide as much information or as accurate information as desired for performing forestry management.

Thus, the illustrative embodiments provide a method and apparatus for managing a forest. In one illustrative embodiment, a forestry manager is configured to receive information about a forest from a group of autonomous vehicles. The forestry manager analyzes the information to generate a result about a state of the forest. The forestry manager also coordinates the operation of the group of autonomous vehicles using the result.

Figure 1:
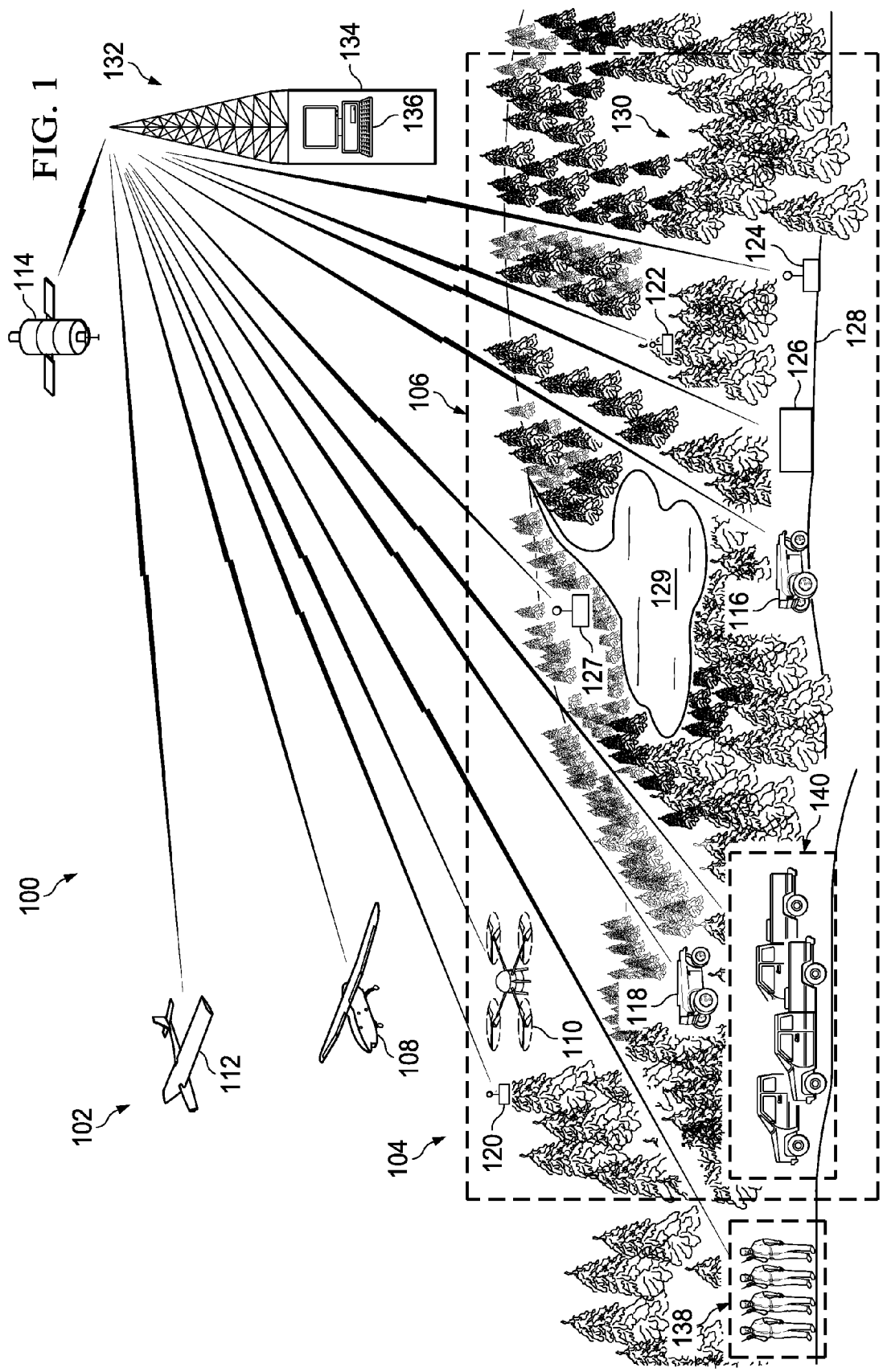
FIG. 1 is an illustration of a forestry management environment in accordance with an illustrative embodiment.

With reference now to the figures and, in particular, with reference to FIG. 1, an illustration of a forestry management environment is depicted in accordance with an illustrative embodiment. As depicted, forestry management environment 100 includes assets 102.

Assets 102 generate information about locations in forest 104 such as location 106. In this illustrative example, assets 102 include unmanned vehicles such as unmanned aerial vehicle 108, unmanned aerial vehicle 110, unmanned aerial vehicle 112, satellite 114, unmanned ground vehicle 116, and unmanned ground vehicle 118. Additionally, assets 102 also may include sensor systems such as ground-based sensor 120, ground-based sensor 122, and ground-based sensor 124. Support system 126 also may be present to provide support for the unmanned vehicles.

As depicted, unmanned aerial vehicle 108 and unmanned aerial vehicle 110 may operate at lower altitudes as compared to unmanned aerial vehicle 112. For example, unmanned aerial vehicle 108 and unmanned aerial vehicle 110 may operate from ground 128 of forest 104 up to altitudes of about 2,000 feet in these illustrative examples. Unmanned aerial vehicle 112 may operate at higher altitudes such as altitudes over 30,000 feet depending on the particular implementation.

As depicted, unmanned aerial vehicle 108, unmanned aerial vehicle 110, and unmanned aerial vehicle 112 use onboard sensors to generate information about location 106 in forest 104. Satellite 114 also may use onboard sensors to generate information about location 106 in forest 104.

In these illustrative examples, unmanned ground vehicle 116 and unmanned ground vehicle 118 may move on ground 128 of forest 104. Unmanned ground vehicle 116 and unmanned ground vehicle 118 also may generate information about location 106 in forest 104 using onboard sensors.

Additionally, ground-based sensor 120, ground-based sensor 122, ground-based sensor 124, and ground-based sensor 127 are present in location 106 in forest 104 and also generate information about location 106 in forest 104. In these illustrative examples, ground-based sensor 120 and ground-based sensor 122 may be placed in trees 130. Ground-based sensor 124 may be located on ground 128 in forest 104.

In some illustrative examples, ground-based sensors may be operated near water. In these illustrative examples, ground-based sensor 127 may be placed near body of water 129. In these illustrative examples, ground-based sensor 127 may be used to measure the water quality of body of water 129.

In these illustrative examples, support system 126 may be a stationary structure or a mobile structure. For example, support system 126 may be a base, a station, a van, or other structure that provides support for at least one of unmanned aerial vehicle 108, unmanned aerial vehicle 110, unmanned ground vehicle 116, and unmanned ground vehicle 118 to recharge batteries, exchange batteries, or otherwise obtain power to operate.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

Additionally, support system 126 also may provide shelter from the environment, repair facilities, and provide other services to one or more of unmanned aerial vehicles or unmanned ground vehicles. In this illustrative example, support system 126 may operate in an automated fashion without need for human intervention. In some cases, support system 126 also may store information that may be generated by unmanned aerial vehicle 108, unmanned aerial vehicle 110, unmanned ground vehicle 116, or unmanned ground vehicle 118.

The information generated by assets 102 may be sent over wireless communications links 132 to control station 134. Forestry manager 136 in control station 134 is configured to process the information generated by assets 102.

Additionally, forestry manager 136 also may coordinate the operation of assets 102 in these illustrative examples. This coordination may include directing the movement of assets 102, identifying locations in forest 104 for monitoring, and other suitable operations that may be performed by assets 102. In some illustrative examples, forestry manager 136 and the components in forestry manager 136 may be distributed between control station 134 and other components in forestry management environment 100.

For example, forestry manager 136 may be distributed between control station 134 and support system 126. For example, a portion of forestry manager 136 may be located in support system 126 while another portion of forestry manager 136 may be located in control station 134. In this case, the components in forestry manager 136 may be in communication with each other over wireless communications links 132.

In other illustrative examples, forestry manager 136 may be distributed within computers in assets 102. For example, forestry manager 136 may be distributed in control station 134, unmanned aerial vehicle 112, and unmanned ground vehicle 116.

In some illustrative examples, assets 102 also may include personnel 138 and manned vehicles 140. Personnel 138 and manned vehicles 140 may supplement operations performed by the unmanned assets in these illustrative examples. Additionally, forestry manager 136 also may provide directions to at least one of personnel 138 and manned vehicles 140 to coordinate the operation of these assets. In this manner, the operation of different assets, both unmanned assets and manned assets, are coordinated by forestry manager 136 in control station 134.

Figure 2:
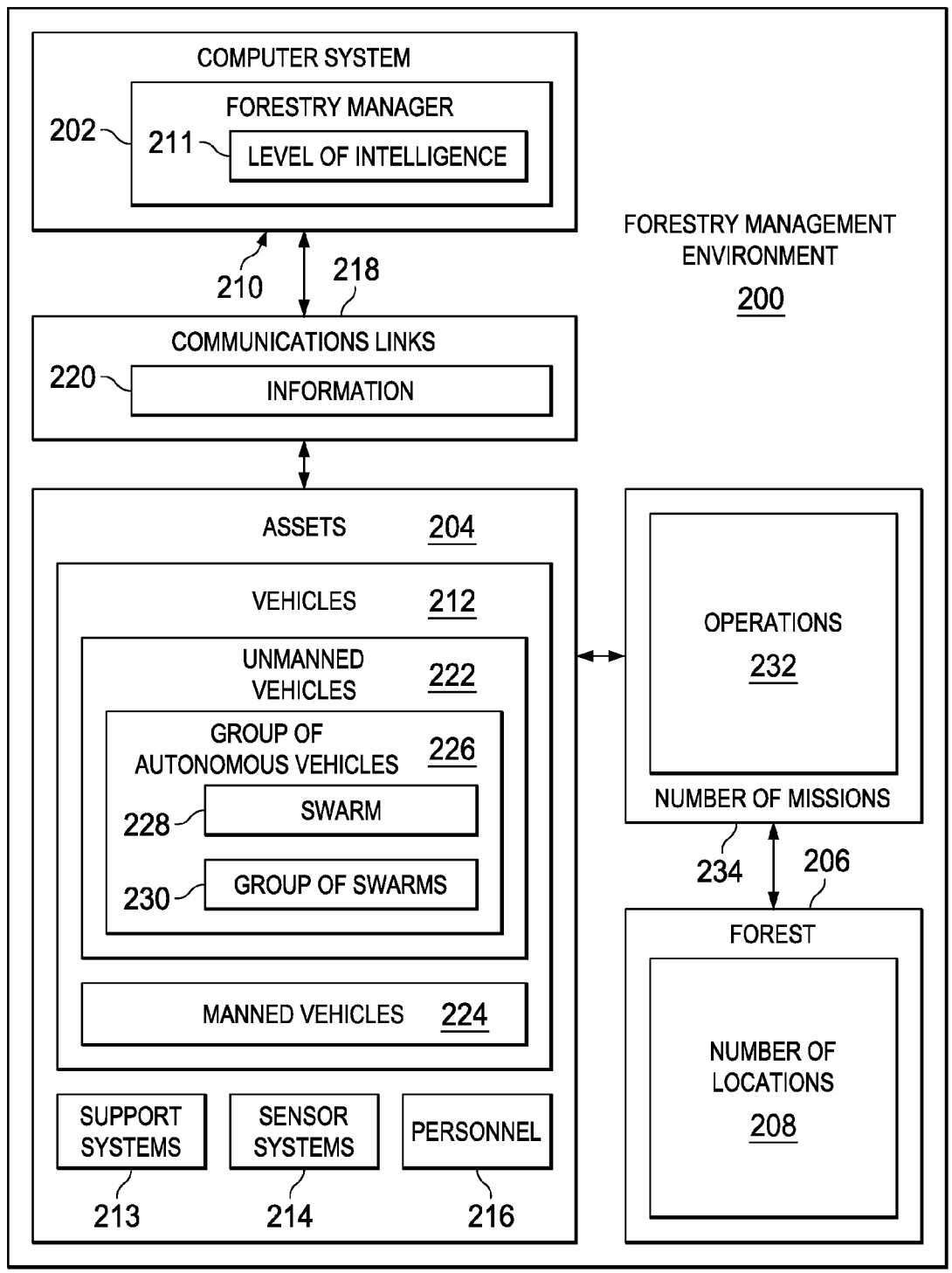
FIG. 2 is an illustration of a block diagram of a forestry management environment in accordance with an illustrative embodiment.

With reference now to FIG. 2, an illustration of a block diagram of a forestry management environment is depicted in accordance with an illustrative embodiment. Forestry management environment 100 in FIG. 1 is an example of one implementation for forestry management environment 200 in FIG. 2.

In this illustrative example, forestry management environment 200 includes forestry manager 202 and assets 204. Forestry manager 202 and assets 204 are configured to manage forest 206.

In particular, forestry manager 202 may be configured to manage number of locations 208 in forest 206. As used herein, a "number of" when used with reference to items means one or more items. For example, number of locations 208 is one or more locations. Number of locations 208 may be a portion of forest 206 or may include all of forest 206.

In this illustrative example, forestry manager 202 may be implemented using hardware, software, or a combination of the two. When software is used, the operations performed by forestry manager 202 may be implemented in program code configured to run on a processor unit. When hardware is employed, the hardware may include circuits that operate to perform the operations in forestry manager 202.

For example, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices.

Additionally, the processes may be implemented in organic components integrated with inorganic components and/or may be comprised entirely of organic components excluding a human being. For example, the processes may be implemented as circuits in organic semiconductors.

As depicted, forestry manager 202 may be implemented within computer system 210. Computer system 210 is one or more computers. When more than one computer is present in computer system 210, those computers may be in communication with each other over a communications medium such as a network.

These computers may be in the same geographic location or separate geographic locations depending on the particular implementation. Further, in some illustrative examples, a portion or all of computer system 210 may be mobile. For example, one or more computers in computer system 210 may be located in or carried by a platform such as a truck, an aircraft, a ship, a human operator, or some other suitable platform.

In these illustrative examples, forestry manager 202 may have level of intelligence 211. Level of intelligence 211 may vary depending on the implementation of forestry manager 202. In some cases, forestry manager 202 may be a computer program that receives input from a human operator and provides output to a human operator.

In other illustrative examples, level of intelligence 211 may be higher such that input from a human operator may be unnecessary. For example, an artificial intelligence system and other suitable types of processors may provide a desired level of intelligence for level of intelligence 211 in forestry manager 202. In particular, the artificial intelligence system may include an expert system, a neural network, simple heuristics, fuzzy logic, Bayesian networks, or some other suitable type of system that provides a desired level of intelligence for level of intelligence 211 in forestry manager 202.

As depicted, assets 204 include at least one of vehicles 212, support systems 213, sensor systems 214, and personnel 216. In these illustrative examples, assets 204 may communicate with forestry manager 202 and with each other using communications links 218.

For example, assets 204 may generate information 220. Information 220 may be sent to forestry manager 202 over communications links 218. Additionally, information 220 may be exchanged between assets 204 over communications links 218. In these illustrative examples, information 220 may include, for example, information about at least one of vegetation, soil conditions, wildlife, air quality, pollution, temperature, rainfall, and other suitable types of information.

As depicted, vehicles 212 may include unmanned vehicles 222 and manned vehicles 224. Vehicles 212 may generate information 220 as vehicles 212 travel through or near number of locations 208 in forest 206. Unmanned vehicles 222 may be remotely controlled by personnel 216 or may be autonomous. Unmanned vehicles 222 may be selected from at least one of an unmanned aerial vehicle, an unmanned ground vehicle, an unmanned water vehicle, and other suitable types of unmanned vehicles. When unmanned vehicles 222 are unmanned water vehicles, the unmanned water vehicles may be used in a lake, a pond, a river, or some other suitable type of body of water near the forest. Manned vehicles 224 are vehicles that may carry personnel 216 and are operated by personnel 216.

Additionally, unmanned vehicles 222 may include group of autonomous vehicles 226. An autonomous vehicle is a vehicle that operates without intervention from a human operator. In these illustrative examples, an autonomous vehicle may be remotely controlled or may have a desired level of intelligence. As used herein, a "group" when used with reference to items means one or more items. For example, group of autonomous vehicles 226 is one or more autonomous vehicles. Group of autonomous vehicles 226 may be configured to operate as swarm 228 or group of swarms 230 in these illustrative examples.

Support systems 213 are hardware systems configured to provide support for vehicles 212. In particular, support systems 213 may provide support for unmanned vehicles 222. For example, support systems 213 may provide shelter, power, maintenance, and other types of support for unmanned vehicles 222.

Sensor systems 214 are also configured to generate information 220. In these illustrative examples, sensor systems 214 are in fixed locations in number of locations 208 or near number of locations 208 in forest 206.

Personnel 216 may perform operations including generation of information 220. For example, personnel 216 may carry sensors, operate manned vehicles 224, or operate unmanned vehicles 222 that are not within group of autonomous vehicles 226.

In this illustrative example, forestry manager 202 is configured to coordinate operations 232 performed by assets 204. Coordinating the operation of group of autonomous vehicles 226 to perform collection of information 220 may include collecting information 220 in at least one of a selected area in the forest, over a selected period of time, and with a selected level of detail.

Coordinating operations 232 also involves directing assets 204 to perform number of missions 234. Coordinating assets 204 to perform number of missions 234 may reduce redundancy or overlap in the operation of assets 204 when redundancy or overlap is undesirable.

Further, coordinating assets 204 to perform number of missions 234 may include directing assets 204 by, for example, without limitation, sending at least one of a command, a message, a mission, a task, data, and other information that directs and/or gives guidance in performing number of missions 234. This coordination may occur in a manner such that operations 232 are performed such that some or all of assets 204 may work together, as a single group, or in multiple groups to perform number of mission 234.

For example, forestry manager 202 may coordinate swarm 228 by sending commands to each of the autonomous vehicles in swarm 228. In these illustrative examples, swarm 228 is a plurality of autonomous vehicles, such as group of autonomous vehicles 226, which coordinate the performance of operations 232 with each other.

In yet other illustrative examples, forestry manager 202 may send tasks to each of the autonomous vehicles in swarm 228. Thus, group of autonomous vehicles 226 may use tasks and perform operations based on the tasks sent to each of the vehicles in group of autonomous vehicles 226.

In still another illustrative example, forestry manager 202 may send tasks to manned vehicles 224 in addition to swarm 228 of group of autonomous vehicles 226. When commands are sent to manned vehicles 224, these commands may be viewed by personnel 216 in manned vehicles 224 in these illustrative examples. Further, personnel 216 in manned vehicles 224 may use these commands as input to control manned vehicles 224. In other illustrative examples, personnel 216 may use these commands to perform operations on foot.

As depicted, forestry manager 202 may direct swarm 228 to a particular location in number of locations 208 and direct swarm 228 to generate information 220 in the particular location. In another example, forestry manager 202 may direct swarm 228 to travel along a selected path.

In a similar fashion, forestry manager 202 may send information for different missions in number of missions 234 to group of swarms 230. Thus, a swarm in group of swarms 230 may perform the same or different missions from other swarms in group of swarms 230.

With the use of forestry manager 202 and unmanned vehicles 222, the amount of personnel 216 may be reduced as compared to currently used systems. Further, when personnel 216 are limited, the use of unmanned vehicles 222 and, in particular, group of autonomous vehicles 226, may increase the ability to collect a desired amount of information 220 along with a desired accuracy and consistency for information 220 as compared to currently used systems for collecting information from number of locations 208 in forest 206.

Figure 3:
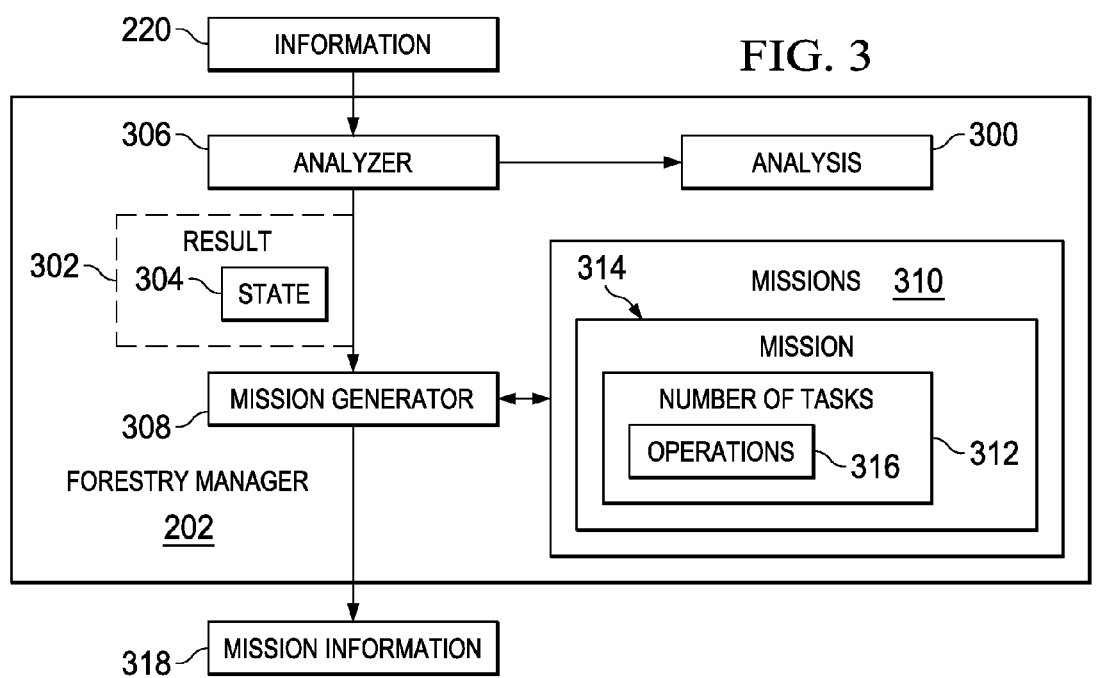
FIG. 3 is an illustration of data flow in a forestry manager in accordance with an illustrative embodiment.

Turning now to FIG. 3, an illustration of data flow in a forestry manager is depicted in accordance with an illustrative embodiment. In this depicted example, forestry manager 202 analyzes information 220 received from assets 204 in FIG. 2. In particular, forestry manager 202 performs analysis 300 using information 220.

In these illustrative examples, analyzer 306 performs analysis 300 to generate result 302. Result 302 includes state 304 for forest 206 in FIG. 2. State 304 may be, for example, without limitation, the state of forest health, forest inventory, safety risks, illegal activity, and other types of states of forest 206.

In these illustrative examples, analysis 300 of information 220 may be performed in a number of different ways to obtain result 302. Analysis 300 may include inspecting, cleaning, transforming, modeling, and other operations with respect to information 220.

As depicted, analysis 300 may be performed using any currently available analysis technique for data. For example, without limitation, analyzer 306 may perform analysis 300 of information 220 using image processing systems, light detection and ranging systems, geographic information systems, visual inspection systems, or other suitable types of systems. In particular, analyzer 306 may perform analysis 300 to obtain result 302 by using data clustering and correlation, anomaly detection, statistical and prognostic methods, and other suitable types of data analysis techniques. In some cases, analysis 300 also may include simulations using models of forest 206.

In other illustrative examples, result 302 may be obtained using a cloud detection system with trajectory generation methods and airborne laser scanners to provide timely and complete coverage of forest 206. Specifically, forest manager 202 may perform analysis 300 on information 220 using this cloud detection system to obtain result 302 over a larger area of forest 206 than may be feasible with the use of currently available systems.

With result 302, mission generator 308 identifies missions 310. Additionally, mission generator 308 also may identify missions 310 without result 302. For example, prior to obtaining information 220 about forest 206, mission generator 308 may generate one or more of missions 310 to obtain information 220 for analysis 300 by analyzer 306. In this illustrative example, a mission is a goal or objective. In other words, a mission in missions 310 may be one or more goals or objectives.

For example, mission generator 308 identifies number of tasks 312 for mission 314 in missions 310. A task is a piece of work that is performed to achieve a mission. A task may be comprised of operations 316 that are performed for the piece of work.

Number of tasks 312 is one or more tasks to be performed by assets 204 in FIG. 2. Each task in number of tasks 312 may include one or more operations in operations 316. Mission generator 308 also may identify operations 316 for number of tasks 312 in generating mission 314.

For example, a mission may be to gather more information 220 about forest 206. The task in number of tasks 312 may be to monitor a particular location in number of locations 208 in forest 206. Operations 316 for the tasks may be to fly a selected path over the location in number of locations 208 in forest 206 and generate images of the location.

In these illustrative examples, mission generator 308 assigns at least one of mission 314, number of tasks 312, and operations 316 to assets 204. In other words, mission generator 308 may send different levels of mission information 318 to assets 204 depending on the intelligence of assets 204 that are to perform mission 314. This mission information 318 may be the same mission information 318 sent to each of assets 204. In other illustrative examples, mission information 318 may be different for each of the assets in assets 204. In this manner, forestry manager may coordinate the performance of missions 310 by sending mission information 318.

For example, mission generator 308 may generate mission 314 with number of tasks 312. Mission generator 308 assigns number of tasks 312 to group of autonomous vehicles 226 in FIG. 2. With the assignment of number of tasks 312, mission generator 308 sends mission information 318 to group of autonomous vehicles 226 to perform number of tasks 312 in mission 314.

In this manner, group of autonomous vehicles 226 may perform number of tasks 312 to complete all or a portion of mission 314. In some illustrative examples, mission generator 308 may assign a portion of number of tasks 312 to group of autonomous vehicles 226 and another portion of number of tasks 312 to manned vehicles 224 in FIG. 2. In this case, both group of autonomous vehicles 226 in unmanned vehicles 222 and manned vehicles 224 use mission information 318 to complete a portion of mission 314.

For example, when coordinating trespasser response, mission 314 may be to assist law enforcement. Mission generator 308 may send mission information 318 to unmanned aerial vehicle 108 to track an intruder, unmanned aerial vehicle 110 to take video footage of a crime scene, and manned vehicles 140 to bring personnel 138 in FIG. 1 to the location of the trespassing event. In this manner, each of assets 102 performs a portion of number of tasks 312 to complete mission 314 using mission information 318 sent by mission generator 308.

Mission information 318 may take various forms. For example, mission information 318 may include commands, tasks, data, and other suitable information. As an example, number of tasks 312 may be sent in mission information 318 to group of autonomous vehicles 226 such that group of autonomous vehicles 226 performs operations 316 necessary to achieve number of tasks 312 in mission 314. In other cases, mission information 318 may include commands needed to perform operations 316 to complete number of tasks 312 for missions 310.

In some cases, an identification of mission 314 in mission information 318 may be sufficient for assets 204 to perform mission 314. In other cases, number of tasks 312 may be assigned to assets 204.

For example, the assignment may involve assigning number of tasks 312 to one or more of group of autonomous vehicles 226. In other cases, number of tasks 312 may be assigned by sending number of tasks 312 to group of autonomous vehicles 226. Group of autonomous vehicles 226 may coordinate and make their own assignments after receiving number of tasks 312.

In other words, the assignment of number of tasks 312 may be to group of autonomous vehicles 226 as a whole, or to individual autonomous vehicles in group of autonomous vehicles 226. When the assignment of number of tasks 312 is to group of autonomous vehicles 226 as a whole, specific tasks in number of tasks 312 may be distributed to autonomous vehicles in group of autonomous vehicles 226 based on the location of the autonomous vehicles, the capability of the autonomous vehicles, the response time of the autonomous vehicles, or some other suitable parameters.

In another illustrative example, mission generator 308 may send an identification of operations 316 to be performed by different assets in assets 204. These different assets may be, for example, unmanned vehicles 222 and sensor systems 214. These operations 316 may be at various levels and may be as detailed as particular commands on direction of movement, when to collect information, and other operations.

Turning now to FIG. 4, an illustration of a block diagram of types of missions is depicted in accordance with an illustrative embodiment. In this depicted example, types of missions 400 are examples of missions 310 in FIG. 3.

Types of missions 400 may comprise at least one of information gathering 402 and state changes 404. Information gathering 402 comprises missions for obtaining information 220 in FIG. 2. State changes 404 comprise missions for causing a change in state 304 in FIG. 3 identified for forest 206 by forestry manager 202 in FIG. 2. In these illustrative examples, information gathering 402 may include at least one of forest health mission 406, forest inventory mission 408, safety risk identification mission 410, illegal activity mission 412, and natural event damage mission 413.

As depicted, forest health mission 406 is configured to generate information 220 that may be used to identify the health of a location within forest 206. Forest health mission 406 may, for example, obtain information about trees in a location in forest 206. In particular, forest health mission 406 may identify a biodiversity of trees and other vegetation in forest 206.

Additionally, forest health mission 406 may be used to generate information 220 about spacing between trees. This forest health mission 406 may identify a presence of foreign species with respect to trees. In other words, types of species of trees that are not normally present in forest 206 may be identified using forest health mission 406. Additionally, pests, infection, and other information about trees in forest 206 may be identified through information 220 generated from forest health mission 406.

Forest health mission 406 may also collect information 220 that identifies the impact of human activity in forest 206. For example, forest health mission 406 may identify information about unmanaged recreation, hunting, and local agriculture activities in forest 206.

Further, forest health mission 406 also may generate information 220 used to identify the impact of natural events on forest 206. These natural events may include storms, fires, and other events that may occur naturally in forest 206.

Additionally, forest health mission 406 may generate information 220 about the health of vegetation on the floor of forest 206. With this type of mission, information about wildlife within forest 206 and the health of wildlife within forest 206 may be generated.

In these illustrative examples, forest inventory mission 408 may be used to generate information 220 used to classify land within forest 206. For example, forest inventory mission 408 may generate information used to identify a volume of wood that may be harvestable from forest 206. Additionally, carbon sequestration may be identified during forest inventory mission 408. In other words, the capture of carbon dioxide in forest 206 by trees and vegetation may be identified through forest inventory mission 408.

With safety risk identification mission 410, information 220 about safety risks such as a presence of fire may be included in this type of mission. In these illustrative examples, a "safety risk" is a risk of harm to forest 206 as a whole, wildlife or vegetation within forest 206, humans, or a combination thereof. Thus, safety risk identification mission 410 is used to generate information 220 about the safety risks within forest 206.

In some illustrative examples, safety risk identification mission 410 may generate information used to identify hazards to the public. This information may be used to identify what areas may be accessible by the public in forest 206. In this manner, safety risks may be decreased within forest 206. For example, when an area is determined to be a safety risk to the public by safety risk identification mission 410, forest manager 202 in FIG. 2 may send one of assets 204 to block off that area to the public.

Illegal activity mission 412 is used to generate information 220 that may be used to identify various illegal activities within forest 206. These illegal activities may include, for example, without limitation, poaching of timber, poaching of wildlife, illegal drug operations, trespassing in secured areas, squatting, and other illegal activities.

As depicted, natural event damage mission 413 may be used to generate information 220 about the damage that may be present after a natural event. For example, when a flood occurs in forest 206, information 220 about damage caused by the flood may be needed. In this case, forest manager 202 may send one of assets 204 to gather information 220 about state changes 404 resulting from the flood. Of course, forest manager 202 may send one of assets 204 to gather information 220 about other types of natural events such as, for example, without limitation, fire, wind, ice, snow, earthquake, tornado, or some other type of natural event.

In these illustrative examples, state changes 404 include missions that are used to change state 304 of forest 206. The change in state 304 may be for a portion or all of forest 206. As depicted, state changes 404 may include various types of missions 400. For example, state changes 404 may include at least one of intruder tracking mission 414, pest control mission 416, harvesting mission 418, and other suitable types of missions 400.

In these illustrative examples, intruder tracking mission 414 is a mission in which assets 204 are coordinated to identify and track an intruder within forest 206. Pest control mission 416 may be used to control pests that may affect the health of forest 206 in an undesired manner. Pest control mission 416 may be used to send assets 204 to forest 206 to perform operations 316 to control or eliminate pests that may be in forest 206.

For example, assets 204 may distribute chemicals, electrical agents, and other components to control pests that may be present in forest 206. These pests may be vegetation, wildlife, or other types of pests.

Harvesting mission 418 may be performed to harvest trees in forest 206. Assets 204 may be assets configured to harvest trees that have been identified in particular locations in forest 206. For example, tree harvesters in vehicles 212 in FIG. 2 may be used to harvest trees in forest 206. These tree harvesters may take the form of autonomous vehicles within group of autonomous vehicles 226.

The illustration of types of missions 400 in FIG. 4 is only presented as an example of some types of missions that may be present in missions 310. The examples of types of missions 400 are not meant to imply limitations to other types of missions that may be used. Further, in some cases, only some of the missions illustrated in types of missions 400 may be used rather than all of the types of missions in types of missions 400. The tasks and the operations performed for each of types of missions 400 may vary and may be implemented in numerous different ways depending on the makeup of forest 206 and the particular situation.

With reference now to FIG. 5, an illustration of a block diagram of a task is depicted in accordance with an illustrative embodiment. In this depicted example, task 500 is an example of a task that may be used to implement one or more of number of tasks 312 in FIG. 3.

As depicted, task 500 may have a number of different components. In this illustrative example, task 500 includes location 502, duration 504, and information collection 506.

Location 502 is a location in which task 500 is to be performed. Location 502 may be defined as a geographic area, a physical volume, or a path. For example, location 502 may define an area on the ground in which the task is to be performed. In other illustrative examples, location 502 also may define a height in which information 220 in FIG. 2 is to be collected. In other illustrative examples, location 502 may be defined as a path that is to be traveled by the asset for the task.

Duration 504 identifies a period of time during which the task is to be performed. Duration 504 may include a start time and an end time.

In some illustrative examples, duration 504 may be defined based on an amount of power remaining in the asset for performing the task. In some cases, duration 504 may be defined as an amount of information 220 collected, a type of information 220 collected, or based on some other parameter other than time. Of course, a combination of these different types of measurements for duration 504 also may be used.

Information collection 506 identifies the type of information 220 to be collected and may also identify the manner in which information 220 is to be collected. In this case, information 220 may include information such as images, temperature readings, humidity readings, sample collections, and other suitable types of information. Further, information collection 506 also may define a frequency at which information 220 is to be collected.

Further, information collection 506 also may define the granularity of information 220 to be collected. For example, information collection 506 may define a higher granularity such that information 220 generates images of the height, straightness, taper, and volume of trees. In other illustrative examples, a lower granularity may merely comprise generating images of the location rather than more detailed measurements of trees in the location. Of course, any granularity may be defined in information collection 506 for task 500.

Turning now to FIG. 6, an illustration of a block diagram of an autonomous vehicle is depicted in accordance with an illustrative embodiment. In this depicted example, autonomous vehicle 600 is an example of one implementation for an autonomous vehicle within group of autonomous vehicles 226 in FIG. 2. Unmanned aerial vehicle 108, unmanned aerial vehicle 110, unmanned aerial vehicle 112, unmanned ground vehicle 116, and unmanned ground vehicle 118 are physical examples of unmanned vehicles that may be implemented as autonomous vehicles using components in autonomous vehicle 600.

In this illustrative example, autonomous vehicle 600 includes a number of different components. For example, autonomous vehicle 600 includes support structure 602, movement system 604, sensor system 606, communications system 608, controller 610, and power source 612.

Support structure 602 provides a structure for physical support of the other components in autonomous vehicle 600. Support structure 602 may be, for example, at least one of a frame, a housing, a body, and other suitable types of structures.

Movement system 604 is associated with support structure 602 and is configured to provide movement for autonomous vehicle 600. Movement system 604 may take various forms. For example, movement system 604 may include at least one of legs, wheels, tracks, and other suitable types of mechanisms for moving autonomous vehicle 600.

Sensor system 606 is a system associated with support structure 602. Sensor system 606 is configured to generate information about the environment around autonomous vehicle 600. Sensor system 606 may include many types of sensors.

In these illustrative examples, sensor system 606 may include number of sensor modules 614. In these illustrative examples, a sensor module in number of sensor modules 614 is removable. In other words, one sensor module may be swapped out for another sensor module in number of sensor modules 614 in sensor system 606 in autonomous vehicle 600.

In this manner, creator versatility may be provided for autonomous vehicle 600. In particular, a sensor module in number of sensor modules 614 may be selected for use by autonomous vehicle 600 depending on the mission or task assigned to autonomous vehicle 600. Further, with the use of number of sensor modules 614, the weight of autonomous vehicle 600 may be reduced by reducing the number of sensors in sensor system 606 only to those needed for a particular mission or task.

For example, sensor module 616 may be comprised of number of sensors 618. The composition of number of sensor 618 may be selected for the particular type of mission or task to be performed.

Communications system 608 is associated with support structure 602. As depicted, communications system 608 is configured to provide communications between autonomous vehicle 600 and another device. This other device may be, for example, one of other assets in assets 204, computer system 210, forestry manager 202, and other suitable components. The communications may be wireless communications in these illustrative examples. In some cases, a wired communications interface may also be present.

Power source 612 is associated with support structure 602. Power source 612 is configured to provide power for the other components in autonomous vehicle 600. Power source 612 may take a number of different forms. For example, power source 612 may include at least one of energy system 620 and energy harvesting system 622.

In this illustrative example, energy system 620 may include one or more batteries. These batteries may also be modular and replaceable. In other illustrative examples, energy system 620 may be a fuel cell or some other suitable type of energy system.

Energy harvesting system 622 is configured to generate power for components in autonomous vehicle 600 from the environment around autonomous vehicle 600. For example, energy harvesting system 622 may include at least one of a biomechanical harvesting system, a piezoelectric harvesting system, a thermoelectric harvesting system, a tree-metabolic harvesting system, solar cells, a micro wind turbine generator, an ambient radio wave receiver, and other suitable types of energy harvesting systems that generate power from the environment around autonomous vehicle 600.

In this illustrative example, controller 610 is associated with support structure 602. As depicted, controller 610 takes the form of hardware and may include software.

Controller 610 is configured to control the operation of autonomous vehicle 600. Controller 610 may provide level of intelligence 624. Level of intelligence 624 may vary depending on the particular implementation of autonomous vehicle 600. Level of intelligence 624 may be one example of level of intelligence 211 in FIG. 2.

In some cases, level of intelligence 624 may be such that controller 610 receives specific commands. These commands may include, for example, a direction of travel, a waypoint, when to generate information 220 using sensor system 606, and other similar commands.

In other illustrative examples, level of intelligence 624 may be higher such that autonomous vehicle 600 may receive a task. Controller 610 may identify operations for performing the task. This task may be a fixed task in which autonomous vehicle 600 follows a path in a particular area to generate information 220 using sensor system 606.

In other illustrative examples, level of intelligence 624 may be even higher such that autonomous vehicle 600 is configured to communicate with other autonomous vehicles to coordinate performing one or more tasks. For example, controller 610 may include a circuit, a computer program, an artificial intelligence system, and other suitable types of processes that may provide a desired level for level of intelligence 624.

In these illustrative examples, intelligence system 628 may provide level of intelligence 624. Intelligence system 628 may use an expert system, a neural network, fuzzy logic, or some other suitable type of system to provide level of intelligence 624.

Level of intelligence 624 in controller 610 may allow for functions such as dynamic path planning. In this manner, obstacles may be identified along a path and may therefore be avoided. This identification and avoidance of obstacles may be performed in real time. These obstacles may include, for example, without limitation, a branch, a tree trunk, and other obstacles in forest 206.

Controller 610 also may monitor health of different systems in autonomous vehicle 600. For example, controller 610 may monitor a level of energy being provided or remaining in power source 612. If power source 612 only includes batteries in energy system 620, controller 610 may direct autonomous vehicle 600 to return to base for the recharging or exchange of batteries.

The illustration of autonomous vehicle 600 in FIG. 6 is not meant to imply limitations to the manner in which autonomous vehicle 600 may be implemented. In other illustrative examples, autonomous vehicle 600 may include other components in addition to or in place of the ones depicted. For example, autonomous vehicle 600 also may include systems for performing state changes. These systems may include, for example, without limitation, a tree logging system, a chemical dispersant system, a water distribution system, and other suitable types of systems.

In yet other illustrative examples, sensor system 606 may include a laser scanner used below the surface of a tree canopy to determine tree size. As another example, sensor system 606 may consist of soil moisture and nutrient monitoring probes that may be deployed to identify optimal timing and methods for planting. For example, these nutrient monitoring probes may be used to sample soil at various depths to determine the quantity of carbon or other elements within the soil of forest 206. In still other illustrative examples, sensor system 606 may be used to sample water run-off, streams, and other bodies of water, such as body of water 129 in FIG. 1, to determine state changes 404 of these bodies of water within forest 206.

Turning now to FIG. 7, an illustration of a block diagram of a positioning and map building sensor module is depicted in accordance with an illustrative embodiment. As depicted, sensor module 700 is an example of one implementation of sensor module 616 in sensor system 606 in FIG. 6.

Sensor module 700 takes the form of positioning and mapping sensor module 702. Positioning and mapping sensor module 702 may be removable or fixed within sensor system 606 depending on the particular implementation.

As depicted, sensor module 700 includes global positioning system receiver 704, inertial measurement unit 706, altimeter 708, wheel encoder 710, laser range finder 712, and camera system 714.

Global positioning system receiver 704 may be used to identify a location of the global positioning system receiver in autonomous vehicle 600 in three-dimensional coordinates. These coordinates may include latitude, longitude, and altitude. Global positioning system receiver 704 uses a satellite system to provide these three-dimensional coordinates.

Inertial measurement unit 706 may also be used to identify the three-dimensional coordinates of autonomous vehicle 600. Inertial measurement unit 706 may supplement or provide refinement of positions generated by global positioning system receiver 704.

As depicted, altimeter 708 may identify an altitude of autonomous vehicle 600 when global positioning system receiver 704 does not provide a desired level of accuracy. In these examples, wheel encoder 710 may provide an odometer reading. Specifically, wheel encoder 710 may estimate distance traveled by counting the number of rotations of the wheel.

In the illustrative examples, laser range finder 712 is configured to identify distances to different objects around autonomous vehicle 600. Laser range finder 712 may generate three-dimensional coordinates for features around autonomous vehicle 600. In particular, laser range finder 712 may generate data for a point cloud. This point cloud may be used to generate a three-dimensional map of one or more locations in forest 206.

Camera system 714 is configured to generate images. These images may be correlated with data for the point cloud. In these illustrative examples, camera system 714 may include one or more cameras. For example, camera system 714 may include a visible light camera, a stereographic camera, an infrared camera, and other suitable types of cameras.

The illustration of sensor module 700 is not meant to imply limitations to the manner in which other sensor modules in sensor system 606 may be implemented for generating positioning and mapping information. For example, other sensor modules may exclude wheel encoder 710 and altimeter 708. In still other illustrative examples, camera system 714 may be unnecessary.

In yet other illustrative examples, sensor module 700 may include a processor unit to pre-process information generated for mapping a location. Further, wheel encoder 710 may be used with ground-based vehicles and may be unnecessary with the aircraft or other vehicles.

Turning now to FIG. 8, an illustration of a block diagram of a sensor module is depicted in accordance with an illustrative embodiment. In this depicted example, sensor module 800 is another example of an implementation for sensor module 616 in sensor system 606 in FIG. 6. As depicted, sensor module 800 takes the form of forest inventory sensor module 802.

In this illustrative example, forest inventory sensor module 802 includes a number of different components. For example, forest inventory sensor module 802 includes global positioning system receiver 804, camera system 806, laser range finder 808, and identifier 810.

Global positioning system receiver 804 is configured to identify a location of sensor module 800 and, in particular, the location of autonomous vehicle 600. Camera system 806 is configured to generate images of the environment around autonomous vehicle 600. In particular, these images may be images of trees and other vegetation.

Laser range finder 808 is configured to identify distances to various objects such as trees or other vegetation. Laser range finder 808 is configured to generate information about the location of these trees with respect to autonomous vehicle 600.

Identifier 810 is configured to classify trees and plants in forest 206. Identifier 810 may take the form of hardware and may include software. In these illustrative examples, identifier 810 may obtain images from camera system 806 and identify trees and vegetation based on the recognition of leaves, flowers, and other features that may be identified in the images.

Thus, the location of a particular tree or piece of vegetation may be identified knowing the location of autonomous vehicle 600 using information from global positioning system receiver 804. In this manner, identifier 810 may perform some processing of position information to generate information about species of trees and other vegetation and the location of these species in forest 206.

Although these illustrative examples depict forest inventory sensor module 802 with global positioning system receiver 804, camera system 806, laser range finder 808, and identifier 810, other components or sensors may be used in addition to or in place of the components illustrated in this figure. For example, sensors in forest inventory sensor module 802 may include hyperspectral imaging sensors, gas sensors, water quality sensors, airborne and terrestrial laser scanners, decay detectors, ground-penetrating radar, or other suitable types of sensors depending on the particular implementation.

With reference now to FIG. 9, an illustration of a block diagram of a support system is depicted in accordance with an illustrative embodiment. In this illustrative example, support system 900 is an example of components that may be used in a support system in support systems 213 in FIG. 2.

As depicted, support system 900 has a number of different components. Support system 900 includes platform 902, covered area 904, communications unit 906, energy replenishment system 907, sensor modules 912, and operator interface 914.

In this illustrative example, platform 902 is a structure on which autonomous vehicle 600 in FIG. 6 may land or move onto depending on the particular implementation. Platform 902 may be a mobile platform, a stationary platform, or some other suitable type of platform in these illustrative examples.

Covered area 904 may be an area in which autonomous vehicle 600 may be sheltered from the environment. Communications unit 906 may provide communications with autonomous vehicle 600, forestry manager 202, or some other suitable component.

Energy replenishment system 907 may include charging system 908, batteries 910, and other suitable components. Energy replenishment system 907 may be configured to recharge or otherwise provide energy system 620 in FIG. 6 with power.

Charging system 908 is configured to recharge energy system 620 in autonomous vehicle 600 in FIG. 6. Batteries 910 may be used to replace batteries in energy system 620 when batteries are used in energy system 620, instead of recharging batteries depending on the condition of the batteries. Additionally, sensor modules 912 are examples of modules that may be replaceable in number of sensor modules 614 in FIG. 6.

Operator interface 914 may be a display system with a touch screen in these illustrative examples. Operator interface 914 may be viewed by personnel 138 in FIG. 1 to receive commands, missions, or other information about forest 206. Operator interface 914 may also be used to input visual inspection results or other information that may be used by analyzer 306 to perform analysis 300 in FIG. 3.

The illustration of components in support system 900 in FIG. 9 is only shown as an example and is not meant to limit the manner in which other support systems may be implemented. For example, other support systems may omit communications unit 906. In still other illustrative examples, a support system may include a storage device configured to store information generated by autonomous vehicle 600 or other platforms.

The illustration of forestry management environment 200 in FIG. 2 and the different components in FIGS. 2-9 are not meant to imply physical or architectural limitations to the manner in which forestry management environment 200 and the different components may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Further, the different components shown in FIG. 1 may be combined with components in FIGS. 2-9, used with components in FIG. 2-9, or a combination of the two. Additionally, some of the components in FIG. 1 may be illustrative examples of how components shown in block form in FIGS. 2-9 can be implemented as physical structures.

For example, in some illustrative examples, manned vehicles 224 may be omitted from forestry management environment 200 in generating information 220 in FIG. 2. In still other illustrative examples, personnel 216 also may be unnecessary for generating information 220. In yet other illustrative examples, support systems 213 may be omitted. In still other illustrative examples, forestry manager 202 may be located on one of vehicles 212 in these illustrative examples.

Moreover, although specific groupings of sensors are illustrated in support system 900 in FIG. 9 and sensor module 800 in FIG. 8, those sensors may be included in sensor system 606 without taking the form of a removable sensor module. In other words, sensor module 800 and support system 900 may be fixed in sensor system 606.

Turning now to FIG. 10, an illustration of a flowchart of a process for managing a forest is depicted in accordance with an illustrative embodiment. The process illustrated in FIG. 10 may be implemented in forestry management environment 200 in FIG. 2. In particular, the process may be implemented using forestry manager 202 in FIG. 2.

The process begins by receiving information about a forest from a group of autonomous vehicles (operation 1000). The process analyzes the information to generate a result about a state of the forest from the information (operation 1002). The process then coordinates operation of the group of autonomous vehicles using the result (operation 1004) with the process terminating thereafter.

Turning now to FIG. 11, an illustration of a flowchart of a process for processing information received from assets is depicted in accordance with an illustrative embodiment. The process illustrated in FIG. 11 may be implemented in forestry manager 202 in FIG. 2.

The process begins by receiving information from assets (operation 1100). In these illustrative examples, the assets may take various forms. In particular, the assets may be a group of autonomous vehicles that may operate to collect information without human intervention. Specifically, the group of autonomous vehicles may operate as a swarm or as a group of swarms.

The information is analyzed to obtain a result (operation 1102). A state of a forest is identified from the result (operation 1104) with the process terminating thereafter. In these illustrative examples, the result may take various forms such as identifying a state of forest health, forest inventory, safety risks, illegal activity, and other states.

With reference now to FIG. 12, an illustration of a flowchart of a process for coordinating the operation of assets is depicted in accordance with an illustrative embodiment. The process illustrated in FIG. 12 may be implemented in forestry manager 202 in FIG. 2. Further, this process may be implemented to use assets 204 such as group of autonomous vehicles 226 in FIG. 2.

The process begins by identifying a mission (operation 1200). This mission may be identified based on at least one of user input, a state of the forest, and other suitable information. For example, user input may select a particular mission to be performed in the forest. In other examples, forestry manager 202 may generate missions based on the state of the forest.

The process identifies tasks for the mission identified (operation 1202). These tasks may be obtained from a pre-selected template of tasks for missions. In other illustrative examples, the tasks may be generated by forestry manager 202 when forestry manager 202 has a level of intelligence that allows for formulating tasks. For example, forestry manager 202 may implement artificial intelligence processes. Next, the process identifies assets that are available for performing the tasks (operation 1204). In these illustrative examples, the assets may be a portion or all of a group of autonomous vehicles that are available for use by the forestry manager.

The process then selects autonomous vehicles for performing the tasks (operation 1206). In these illustrative examples, each autonomous vehicle may be assigned a task or a group of autonomous vehicles may be assigned one or more tasks to perform the tasks as a swarm. The process then sends the tasks to the autonomous vehicles selected (operation 1208) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 13, an illustration of a block diagram of a data processing system is depicted in accordance with an illustrative embodiment. Data processing system 1300 may be used to implement computer system 210 in FIG. 2, controller 610 in FIG. 6, identifier 810 in FIG. 8, and other suitable devices within forestry management environment 200.

In this illustrative example, data processing system 1300 includes communications framework 1302, which provides communications between processor unit 1304, memory 1306, persistent storage 1308, communications unit 1310, input/output unit 1312, and display 1314. In this example, communication framework may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1300 are not meant to provide architectural limitations to the manner in which different embodiments may be implemented. The different illustrative embodiments may be implemented in a data processing system including components in addition to and/or in place of those illustrated for data processing system 1300. Other components shown in FIG. 13 can be varied from the illustrative examples shown. The different embodiments may be implemented using any hardware device or system capable of running program code 1318.

Thus, the illustrative embodiments provide a method and apparatus for managing a forest. In the illustrative examples, a forestry management system may gather information about a forest from autonomous vehicles and analyze that information more efficiently than currently used systems in which human operators collect information about a forest.

Further, the illustrative embodiments also generate missions based on a current state of the forest as well as from user input. These missions may be sent to one or more autonomous vehicles. These missions may include information gathering or state changes to be implemented in the forest. Information gathering may be performed for various purposes in managing the forest. These purposes include maintaining a health of the forest, identifying inventory in the forest, identifying safety risks in the forest, identifying illegal activities in the forest, and other purposes. The effect of changing states in the forest may include fighting fires, pest control, harvesting, and other suitable state changes.

With the use of autonomous vehicles and the capability of having autonomous vehicles cooperate with each other in performing tasks in a swarm, the illustrative examples provide more efficient mechanisms for collecting information, affecting changes, or a combination thereof with respect to a forest.

Further, the use of autonomous vehicles and sensor systems in the illustrative embodiments may allow for a desired level of sampling of information from a sufficient number of locations to obtain results that are more accurate than currently possible. The illustrative embodiments also allow for action to be taken in response to the results that may be more timely and accurate than currently possible.

Further, the illustrative embodiments may avoid issues that result from interpretations of observations made by personnel to generate information about the forest. The use of at least one of unmanned vehicles and sensor systems in the illustrative embodiments results in information being generated in a manner that is less subjective as compared to how information is generated by personnel in the forest.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A forestry management system comprising:
   a computer system; and
   a forestry manager implemented within the computer system and configured to receive information about a forest from a group of autonomous vehicles, analyze the information to generate a result about a state of the forest from the information, and
   coordinate operation of the group of autonomous vehicles using the result, wherein, in being configured to coordinate the operation of the group of autonomous vehicles using the result, the forestry manager is configured to coordinate the operation of the group of autonomous vehicles to perform information collection on at least one of forest health and forest inventory in one or more locations in the forest.

2. The forestry management system of claim 1, wherein in being configured to coordinate the operation of the group of autonomous vehicles using the result, the forestry manager is configured to coordinate the operation of the group of autonomous vehicles to perform information collection about at least one of safety risks, and illegal activity.

3. The forestry management system of claim 2,
   wherein the information collected is about the forest health to
      identify a health of a location within the forest,
      identify a biodiversity of trees and vegetation in the forest,
      generate information about spacing between trees,
      identify a presence of foreign species with respect to trees that are not normally present in the forest,
      identify pests and infection,
      identify impact of natural events on the forest, and
      generate information about health of vegetation on a floor of the forest and the health of wildlife within the forest.

4. The forestry management system of claim 2,
   wherein the information collected is about forest inventory to
      classify land within the forest,
      identify a volume of wood harvestable from the forest, and
      identify carbon dioxide captured by trees and vegetation of the forest.

5. The forestry management system of claim 1, wherein in being configured to coordinate the operation of the group of autonomous vehicles using the result, the forestry manager is configured to coordinate the operation of the group of autonomous vehicles to perform information collection in a selected area in the forest, over a selected period of time, and with a selected level of detail.

6. The forestry management system of claim 1, wherein in being configured to coordinate the operation of the group of autonomous vehicles using the result, the forestry manager is configured to coordinate the operation of the group of autonomous vehicles to perform information collection about at least one of vegetation, soil conditions, wildlife, air quality, pollution, temperature, and rainfall.

7. The forestry management system of claim 1, wherein in being configured to coordinate the operation of the group of autonomous vehicles using the result, the forestry manager is configured to generate a mission with a number of tasks and assign the number of tasks to the group of autonomous vehicles.

8. The forestry management system of claim 7, wherein in being configured to assign the number of tasks to the group of autonomous vehicles, the forestry manager is configured to send commands for the number of tasks to the group of autonomous vehicles.

9. The forestry management system of claim 7, wherein in being configured to assign the number of tasks to the group of autonomous vehicles, the forestry manager is configured to send the number of tasks to the group of autonomous vehicles.

10. The forestry management system of claim 1, wherein the group of autonomous vehicles is configured to operate as at least one of a swarm and a group of swarms.

11. The forestry management system of claim 1, wherein the result is an identification of at least one of the forest health, forest inventory, safety risks, and illegal activity.

12. The forestry management system of claim 1, wherein the result is an identification of a number of locations that have at least one of a safety risk and an illegal activity, and wherein in being configured to coordinate the operation of the group of autonomous vehicles using the result, the forestry manager is configured to coordinate the group of autonomous vehicles to monitor the number of locations.

13. The forestry management system of claim 1, wherein in being configured to coordinate the operation of the group of autonomous vehicles using the result, the forestry manager is configured to send at least one of a command and a task to the group of autonomous vehicles.

14. The forestry management system of claim 1, wherein a vehicle in the group of autonomous vehicles is selected from at least one of an unmanned aerial vehicle, an unmanned ground vehicle, and an unmanned water vehicle.

15. The forestry management system of claim 1, wherein a vehicle in the group of autonomous vehicles comprises:
    a support structure;
    a movement system associated with the support structure, wherein the movement system is configured to move the support structure;
    a sensor system associated with the support structure, wherein the sensor system is configured to generate a portion of the information;
    a controller associated with the support structure, wherein the controller is in communication with the movement system and the sensor system and is configured to control operation of the movement system and the sensor system; and
    a power source connected to the movement system, the sensor system, and the controller, wherein the power source is configured to provide power to the movement system, the sensor system, and the controller.

16. The forestry management system of claim 15, wherein the power source comprises an energy harvesting system to provide power to the movement system, the sensor system, and the controller.

17. The forestry management system of claim 1,
    wherein the group of autonomous vehicles travel through the one or more locations in the forest;
    wherein the result is obtained via a simulation using a model of the forest;
    wherein the forestry manager is configured to coordinate operation of manned assets and unmanned assets, the manned assets including one or more personnel and manned vehicles, and the unmanned assets including the group of autonomous vehicles;

wherein the forestry manager generates a mission with a number of tasks;

wherein the mission changes a state of the forest and the forestry manager coordinates missions that are intruder tracking missions, pest control missions, and a harvesting missions;

wherein for an intruder tracking mission, the forestry manager coordinates the manned assets and the unmanned assets to identify and track an intruder within the forest;

wherein for a pest control mission, the forestry manager coordinates the manned assets and the unmanned assets to perform operations to control pests in the forest;

wherein the operations to control pests in the forest comprises distributing chemicals and electrical agents to control pests present in the forest;

wherein the pests comprise vegetation and wildlife; and wherein for a harvesting mission, the forestry manager coordinates the manned assets and the unmanned assets to harvest one or more trees in the forest.

18. The forestry management system of claim 1, wherein the group of autonomous vehicles comprises an unmanned aerial vehicle, an unmanned ground vehicle, and an unmanned water vehicle.

19. A method for managing a forest, the method comprising:

a computer system receiving information about the forest from a group of autonomous vehicles;

the computer system analyzing, by a processor, the information to generate a result about a state of the forest from the information; and the computer system coordinating operation of the group of autonomous vehicles using the result to perform information collection on at least one of forest health and forest inventory in one or more locations in the forest.

20. The method of claim 19, wherein the coordinating step comprises:

coordinating the operation of the group of autonomous vehicles to perform information collection about at least one of safety risks, and illegal activity.

21. The method of claim 19, wherein the coordinating step comprises:

coordinating the operation of the group of autonomous vehicles to perform information collection in at least one of a selected area in the forest, over a selected period of time, and with a selected level of detail.

22. The method of claim 19, wherein the coordinating step comprises:

coordinating the operation of the group of autonomous vehicles to perform information collection about at least one of vegetation, soil conditions, wildlife, air quality, pollution, temperature, and rainfall.

23. The method of claim 19, wherein the coordinating step comprises:

generating a mission with a number of tasks;

assigning the number of tasks to the group of autonomous vehicles;

sending commands for the number of tasks to the group of autonomous vehicles; and sending the number of tasks to the group of autonomous vehicles, wherein the group of autonomous vehicles is configured to operate as at least one of a swarm and a group of swarms.

* * * * *